United States Patent [19]
Teishi

[11] Patent Number: 6,021,609
[45] Date of Patent: Feb. 8, 2000

[54] GLASS RUN

[75] Inventor: Minoru Teishi, Hiroshima, Japan

[73] Assignee: Nishikawa Rubber Co., Ltd., Hiroshima-ken, Japan

[21] Appl. No.: 09/210,075

[22] Filed: Dec. 11, 1998

[30] Foreign Application Priority Data

Mar. 20, 1998 [JP] Japan .................................. 10 092810

[51] Int. Cl.$^7$ .................................................. E06B 7/16
[52] U.S. Cl. .......................................................... 49/479.1
[58] Field of Search ................. 49/479.1, 475.1, 49/440, 441, 495.1

[56] References Cited

U.S. PATENT DOCUMENTS

| | | | |
|---|---|---|---|
| 4,769,947 | 9/1988 | Ogawa et al. | 49/479.1 |
| 4,894,953 | 1/1990 | Nozaki | 49/479.1 X |
| 4,928,431 | 5/1990 | Kuzuhara et al. | 49/479.1 |
| 5,195,274 | 3/1993 | Mishima et al. | 49/441 |
| 5,258,157 | 11/1993 | Nozaki et al. | 49/479.1 X |
| 5,655,333 | 8/1997 | Yamashita | 49/441 |

FOREIGN PATENT DOCUMENTS 7-156653  6/1995  Japan .
9-290645  11/1997  Japan .

Primary Examiner—Jerry Redman
Attorney, Agent, or Firm—Frishauf, Holtz, Goodman, Langer & Chick, P.C.

[57] ABSTRACT

A glass run 5 having an improved sealing ability is provided. The glass run 5 is fit into a door sash 2 of a car in order to guide a descending or ascending door glass 3. The glass run 5 comprises a molded connector 5B for connecting straight parts 5A of the glass run, and it has a U-shaped groove 4 for guiding the door glass 3. The U-shaped groove 4 comprises an outer side wall 6, a bottom wall 7, an inner side wall 8, an outer lip 9 extending from the outer side wall 6 into the groove 4, and an inner lip 10 extending from the inner side wall 8 into the groove 4. The outer and inner lips 9 and 10 hold the door glass 3 through frictional contact. An inner groove 20 is formed in the middle of the outer surface of the inner side wall 8 of the molded connector 5B which is fit into the corner of the door sash 2 in order to reduce the thickness of that groove portion, thereby enabling the inner side wall 8 to be deformed only outward from the car to enhance the airtight contact between the inner lip 10 and the door glass 3.

8 Claims, 4 Drawing Sheets

GLASS RUN

BACKGROUND OF THE INVENTION

1. Field of Invention

This invention relates to a glass run fit into a door sash of an automobile and for guiding a descending or ascending door glass.

2. Description of Related Art

In an automobile, a C-channel type glass run 5 is generally fit into the door sash 2 of a car door 1 for the purpose of guiding a descending or ascending door glass 3 into the groove 4, as shown in FIGS. 6 and 7. In particular, a connector 5B is provided in the corner of the door sash 2 in order to connect two straight glass runs 5A along the frame of the door window. In general, the straight glass runs 5A are formed by extrusion, while the connector 5B is formed by molding.

The glass run 5 comprises an outer wall 6, a bottom 7, and an inner wall 8. The glass run 5 has a U-shaped cross-section, which forms a groove 4 in it. An outer lip 9 extends inward from the outer wall 6. This outer lip 9 comes into contact with the outer surface of the door glass 3 when the door glass 3 ascends. Similarly, an inner lip 10 extends outward from the inner wall 8, which comes into contact with the inner surface of the door glass 3. Also, outer mole lips 11 and 12 extend outward from the outer wall 6, while inner mole lips 13 and 14 extend inward from the inner wall 8.

However, due to the structural limitation of a molding die used in the molding process of the connector 5B of the glass run 5, the outer wall 6 inevitably opens outward by an angle $\theta 1$ with respect to the normal to the bottom wall 7, while the inner wall 8 inevitably opens inward by an angle $\theta 2$ with respect to the normal, as shown in FIGS. 7 and 8. This occurs because a center core is required in the molding process, which turns out as the gap L between the outer lip 9 and the inner lip 10. FIG. 8 illustrates the glass run 5 shown in FIG. 7 viewed from the bottom faces of the outer and inner lips 9 and 10.

If this glass run 5 is fit into the door sash 2, a strain is caused in the molded connector 5B due to the small gap L between the outer and inner lips 9 and 10. As compared with the ideal connector which has no gap L between the outer and inner lips (that is, which has the outer and inner walls parallel to each other without angular deviation), the peripheral length of the corner part of the connector 5B having a gap L between the outer lip 9 and the inner lip 10 becomes slightly longer. This excessive length centers on the middle of the corner of the connector 5B, which causes distortions in the outer and inner walls 6 and 7. The distortion caused in the outer wall 6 is due to the angular deviation of $\theta 1$, while the distortion caused in the inner wall 8 is due to the angular deviation of $\theta 2$.

Such distortions cause the lips to be pushed inward or outward, and the direction of deformation is uncertain. If the inner wall 8 is pushed outward by the strain, the inner lip 10 is also pushed outward, as shown in FIG. 9, and it comes into tighter contact with the door glass 3. In this case, there is no serious problem. However, if the inner wall 8 is pushed inside the car, as shown in FIG. 10, the airtight contact between the inner lip 10 and the door glass 3 is loosened, and a draft noise is generated from the air gap between the door glass 3 and the inner lip 10.

Similarly, if the outer wall 6 is distorted inward, the outer lip 9 is pushed inward, which enhances the contact with the door glass 3. However, if the outer wall 6 is distorted outward, the outer lip 9 is pushed outward, which deteriorates the sealing ability of the outer lip 9. Thus, the airtight contact between the outer lip 9 and the door glass 3 is not maintained any longer.

SUMMARY OF THE INVENTION

Therefore, it is an object of the invention to provide a glass run which has an improved sealing ability with an excellent airtightness between the door glass and the glass run even if the corner part of the molded connector deforms when it is fit into the door sash.

In order to achieve the object, a glass run is designed so that it can forcibly correct the direction of distortion arising in the inner and outer side walls. The glass run (5) is fit into a door sash (2) of a car in order to guide a descending or ascending door glass (3). The glass run (5) comprises a molded connector 5B for connecting straight parts 5A of the glass run (5) at the corner of the door sash (2), and it has a U-shaped groove (4) for guiding the door glass (3). The U-shaped groove (4) comprises an outer side wall (6), a bottom wall (7), an inner side wall (8), an outer lip (9) extending from the outer side wall (6) into the groove (4), and an inner lip (10) extending from the inner side wall (8) into the groove (4). The outer and inner lips (9) and (10) hold the door glass (3) through frictional contact. As a feature of the invention, an inner groove (20) is formed in the middle of the outer surface of the inner side wall (8) of the molded connector 5B in order to reduce the thickness of that portion of the inner side wall (8), thereby enabling the inner side wall (8) to be deformed only outward from the car to enhance the airtight contact between the inner lip (10) and the door glass (3).

An additional outer groove (40) may be formed in the middle of the outer surface of the outer side wall (6) of the molded connector 5B which is fit into the corner of the door sash (2) in order to reduce the thickness of that portion of the outer side wall (6), thereby enabling the outer side wall (6) to be deformed only inward into the car to enhance the airtight contact between the outer lip (9) and the door glass (3).

In another aspect of the invention, a glass run is fit into a door sash (2) of a car in order to guide a descending or ascending door glass (3). The glass run (5) comprises a molded connector 5B which is fit into the corner of the door sash (2) for connecting straight parts (5A) of the glass run. The glass run (5) has a U-shaped groove (4) for guiding the door glass (3), which comprises an outer side wall (6), a bottom wall (7), an inner side wall (8), an outer lip (9) extending from the outer side wall (6) into the groove, and an inner lip (10) extending from the inner side wall (8) into the groove, the outer and inner lips (9) and (10) hold the door glass through frictional contact. An outer groove is formed in the middle of the outer surface of the outer side wall (6) of the molded connector (5B) in order to reduce the thickness of that portion of the outer side wall (6), thereby enabling the outer side wall (6) to be deformed only inward into the car to enhance the airtight contact between the outer lip (9) and the door glass (3).

The numerical symbols denote the corresponding elements described and shown in the preferred embodiment and the drawings.

Because an inner groove is formed in the middle of the outer surface of the inner side wall of the molded connector, when the glass run is fixed to the door sash, the inner side wall is forced to deform toward the outside of the car so that the inner lip deforms only outward from the car, so as to come into tighter contact with the door glass.

In this arrangement, the sealing ability of the inner lip is enhanced, and the draft noise can be prevented.

Even if the side walls of the glass run slightly open with respect to the normal to the bottom wall due to the structural limitation of molding die, the distortion caused by the excessive peripheral length can be overcome by creating airtightness when the glass run is fit into the door sash.

In addition to the inner groove of the inner side wall, the same type of groove (namely, an outer groove) may be formed in the middle of the outer surface of the outer side wall of the molded connector. In this case, the outer lip extending from the outer side wall is forcibly pushed only inward, whereby the door glass is tightly held by both the inner and outer lips.

Such a groove may also be formed only in the outer surface of the outer side wall.

BRIEF DESCRIPTION OF THE DRAWINGS

The above and other objects, features, and advantages of the invention will be apparent from the detailed description which follows by way of exemplary embodiments of the invention with reference to the attached drawings, which are here described.

DETAILED DESCRIPTION OF THE PREFERRED EMBODIMENTS

The preferred embodiments of the invention will now be described in detail with reference to the attached drawings.

Figure 1:
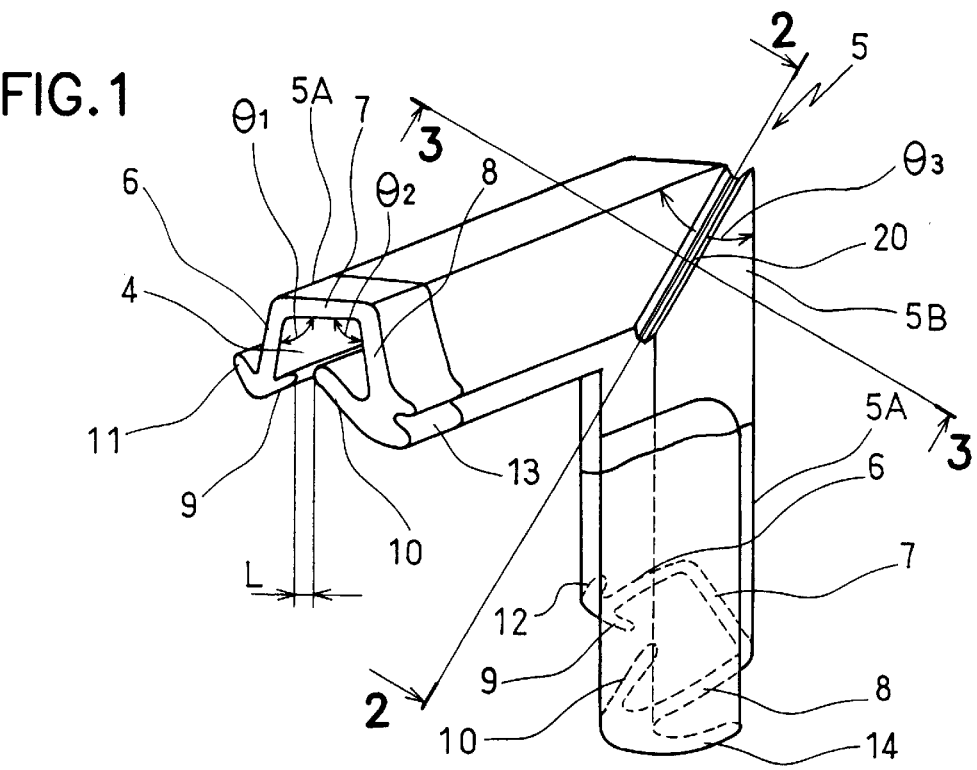
FIG. 1 is an enlarged perspective view of the glass run according to an embodiment of the invention.
Figure 2:
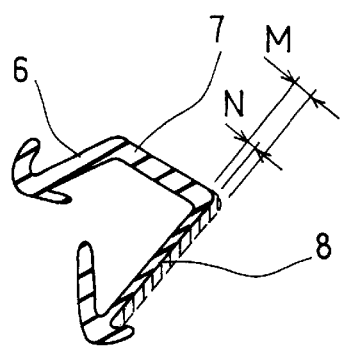
FIG. 2 is a cross-sectional view taken along the line 2—2 shown in FIG. 1.
Figure 3A:
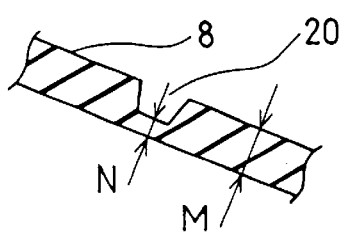
FIGS. 3A and 3B are enlarged cross-sectional views taken along the line 3—3 shown in FIG. 1.
Figure 3B:
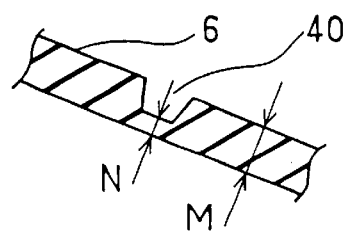

FIG. 1 is an enlarged perspective view of the glass run according to an embodiment of the invention, FIG. 2 is a cross-sectional view taken along the line 2—2 shown in FIG. 1, and FIGS. 3A and 3B are cross-sectional views taken along the line 3—3 shown in FIG. 1.

Figure 6:
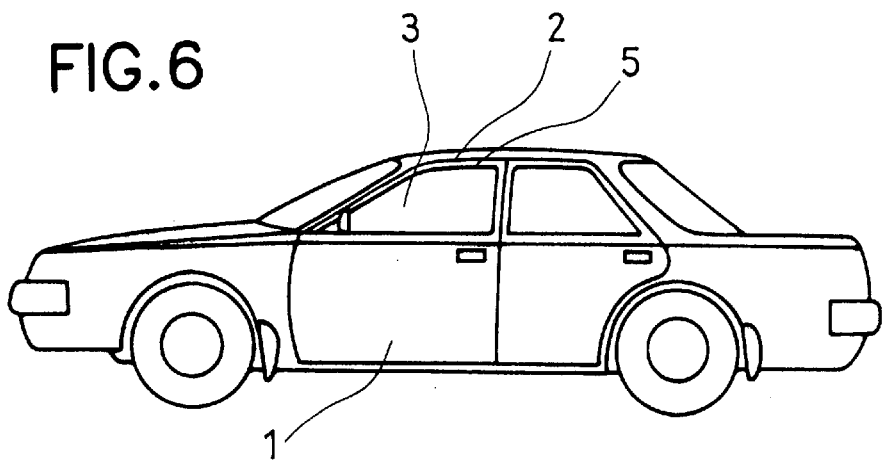
FIG. 6 is a side view of an automobile.
Figure 7:
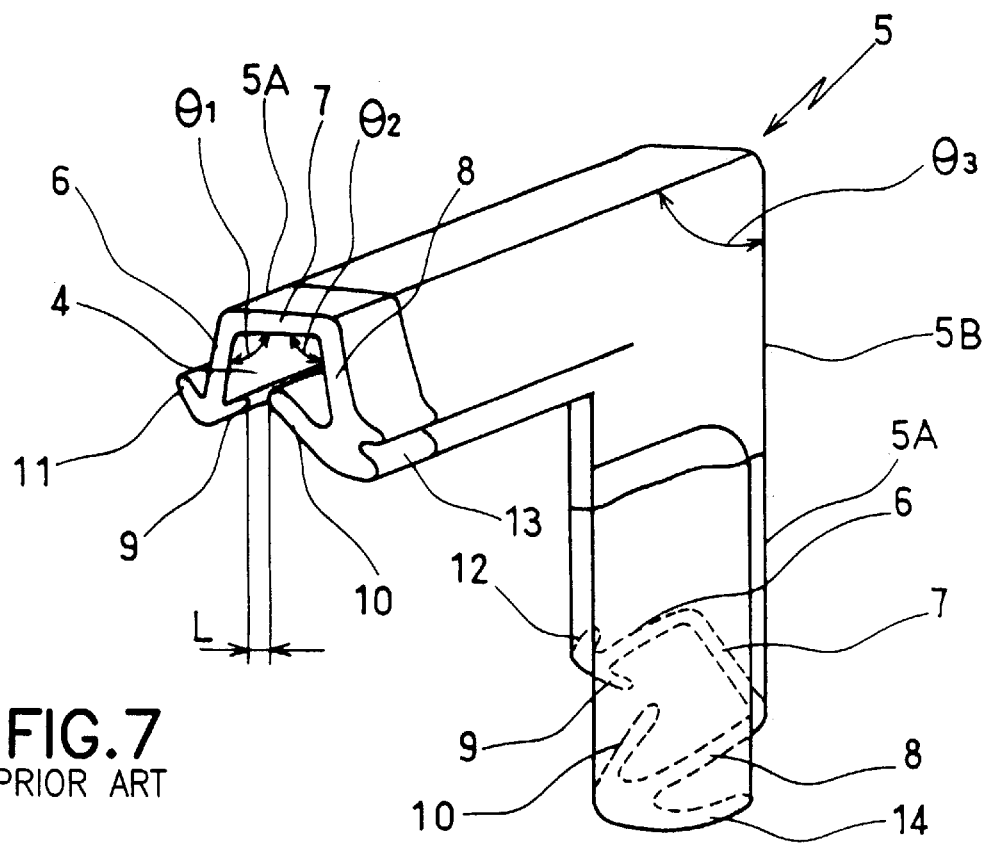
FIG. 7 is an enlarged perspective view of a conventional glass run.
Figure 8:
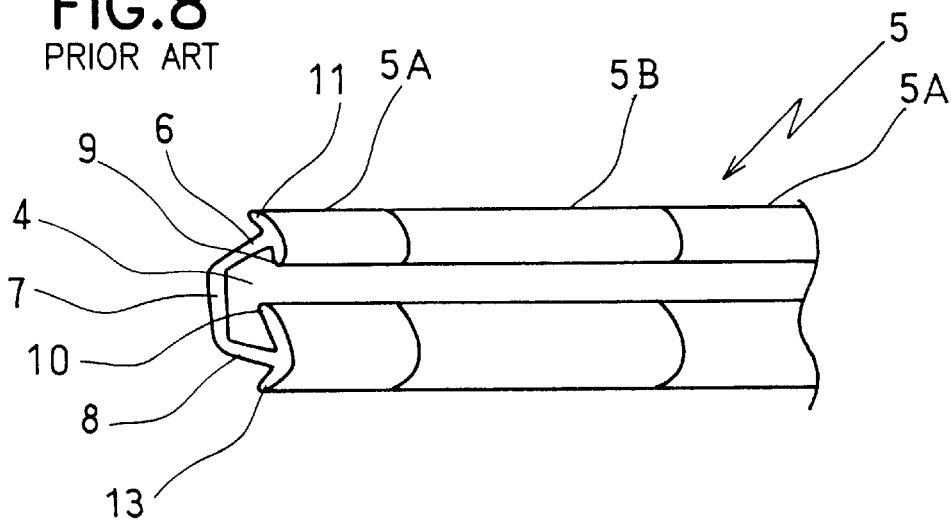
FIG. 8 illustrates the glass run shown in FIG. 7 viewed from a different angle, showing the groove for guiding the door glass.

The glass run 5 of this embodiment is fit into a door sash 2 (FIG. 6) in order to guide the door glass 3 into the groove 4 having a U-shaped cross-section. The groove 4 comprises an outer side wall 6, a bottom wall 7, and an inner side wall 8. An outer lip 9 extends from the outer side wall 6 into the groove 4, while an inner lip 10 extends from the inner side wall 8 into the groove 4, whereby the door glass 3 is held between the outer and inner lips 9 and 10 in an airtight manner. Furthermore, outer mole lips 11 and 12 extend outward from the outer side wall 6, and inner mole lips 13 and 14 extend from the inner side wall 8 toward inside of the car.

The glass run 5 comprises two straight glass runs 5A formed by extrusion, and a connector 5B formed by molding and connecting the two straight glass runs 5A. The molded connector 5B is fit into the corner part of the door sash 2. The outer side wall 6 and the inner side wall 8 slightly open outward making angles of $\theta 1$ and $\theta 2$ with respect to the bottom wall 7. There is a gap L between the outer lip 9 and the inner lip 10, which is required to form a center core (not shown).

Figure 4:
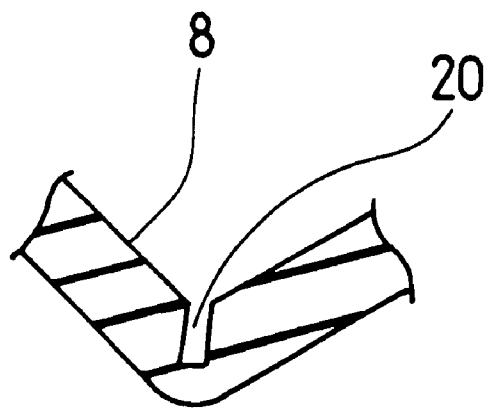
FIG. 4 illustrates the glass run fit into a door sash in a cross-sectional view, in which the groove shown in FIG. 3A is deformed.

An inner groove 20 is formed in the middle of the outer surface of the inner side wall 8 of the molded connector 5B so as to extend obliquely in the middle of the connector 5B. The thickness of the inner side wall 8 is M, while the thickness of the groove portion is N, as shown in FIGS. 2 and 3A. When this glass run 5 is fit into the door sash 2, the inner side wall 8 of the corner portion of the connector 5B is forcibly deformed outward, as shown in FIG. 4, in order to improve the frictional contact between the inner lip 10 and the door glass 3. In FIG. 2, the hatched part indicates the depth of the groove 20, which is the difference between M and N.

Figure 9:
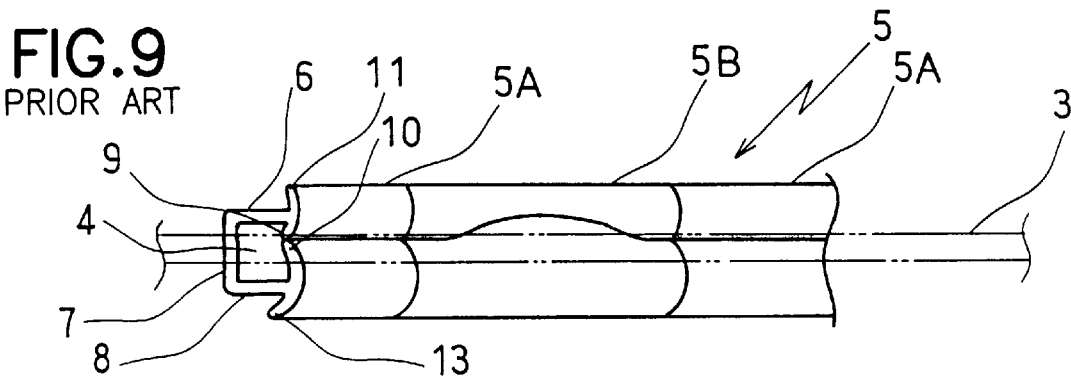
FIG. 9 illustrates the deformed glass run, in which the inner lip is pushed outer side of the car due to the distortion of the inner side wall with the increased sealing ability.
Figure 10:
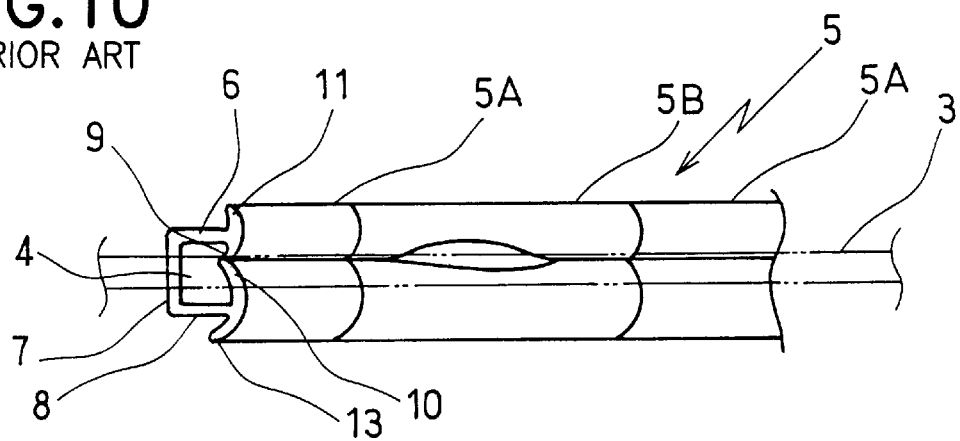
FIG. 10 illustrates the deformed glass run, in which the inner lip is pushed inner side of the car due to the distortion of the inner side wall with the decreased sealing ability.

Because the outer side wall 6 and the inner side wall 8 are slightly open by angles $\theta 1$ and $\theta 2$ with respect to the bottom wall 7, the peripheral length of the practical glass run is slightly longer than that of the ideal glass run whose outer and inner side wall are parallel to each other. If this glass run is fit into the door sash 2, the excessive amount of peripheral length appears as distortion in both the outer and inner side walls 6 and 8 in the middle of the molded connector 5B. To overcome this problem, the inner groove 20 is formed in the inner side wall 8 of the molded connector 5B in this embodiment. In general, the lip size of the inner lip 10 is greater than that of the outer lip 9 and, accordingly, the inner lip 10 is likely to suffer the adverse effect of the distortion. The inner groove 20 formed on the outer surface of the inner side wall 8 corrects the direction of distortion of the inner lip 10 only toward outside of the car. In this arrangement, even if the inner lip 10 is strained due to the excessive peripheral length, it deforms only outward and comes into tighter contact with the door glass 3. This state is shown in FIG. 9 which is viewed from the bottom faces of the outer and inner lips 9 and 10.

The groove 20 extends obliquely from the corner of the connector 5B so that the corner angle $\theta 3$ of the inner side wall 8 is equally divided, as shown in FIG. 1. This arrangement allows the direction of distortion due to the excessive peripheral length to be corrected equally in the lateral and vertical glass runs 5A.

Figure 5:
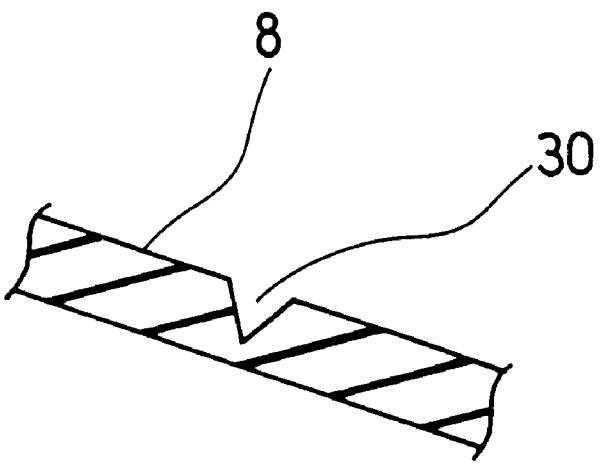
FIG. 5 illustrates another example of deformation of the groove in a cross-sectional view taken along the line 3—3 shown in FIG. 1.

Although, in the embodiment, the U-shaped groove 20 is formed in the molded connector 5B, any shaped groove having the same effect as the U-shaped groove which can effectively correct the direction of distortion, for example, a V-shaped groove 30 shown in FIG. 5, may be formed.

Additionally, as shown in FIG. 3B, an outer groove (40) may be formed in the middle of the outer surface of the outer side wall 6 of the molded connector 5B, in order to enable the outer side wall 6 to be deformed only inward into the car. In this case, even if the outer lip 9 is deformed due to the excessive peripheral length, the outer lip 9 deforms only inward, and comes into tighter contact with the door glass 3.

Alternatively, such a groove may be formed only in the outer side wall 6. This does not reduce the effect of the present invention.

ADVANTAGE OF THE INVENTION

As has been described above, the inner groove formed on the outer surface of the inner side wall of the molded connector can be forcibly deformed only outward from the car. Consequently, the inner lip deforms only outward, and comes into tighter contact with the door glass.

Because the sealing ability of the inner lip is enhanced, the draft noise can be prevented.

Even if the side walls of the glass run slightly open with respect to the normal to the bottom wall due to the structural limitation of molding die, the distortion caused by the excessive peripheral length can be overcome by creating airtightness when the glass run is fit into the door sash.

In addition to the inner groove of the inner side wall, the same type of groove (namely, the outer groove) may be formed on the outer surface of the outer side wall of the molded connector. In this case, the outer side extending from the outer side wall can be forcibly pushed only inward, whereby the door glass is tightly held by both the inner and outer lips.

Such a groove may also be formed only on the outer surface of the outer side wall.

What is claimed is:

1. A glass run adapted to be fit into a door sash of a car for guiding a descending or ascending door glass, said glass run comprising two substantially straight glass run portions and a molded connector for connecting the two straight glass run portions at a corner portion formed by said molded connector, wherein said two substantially straight glass run portions and said molded connector each comprise an outer side wall, a bottom wall, and an inner side wall which together form a U-shaped groove for guiding the door glass;

wherein said two substantially straight glass run portions and said molded connector each further comprise an outer lip extending from the outer side wall into the U-shaped groove, and an inner lip extending from the inner side wall into the U-shaped groove, said outer and inner lips being adapted to hold the door glass through frictional contact; and wherein an inner groove is formed in a middle portion of an outer surface of the inner side wall of the molded connector in order to reduce a thickness of the middle portion of the inner side wall of the molded connector, said inner groove extending obliquely from said corner portion and walls of said molded connector which define said inner groove therebetween also extending obliquely from said corner portion, said inner groove having substantially the same width between said walls throughout the length of said inner groove, thereby enabling the inner side wall and the inner lip to be deformed only outward from the car so as to enhance airtight contact between the inner lip and the door glass.

2. The glass run according to claim 1, wherein an outer groove is formed in a middle portion of an outer surface of the outer side wall of the molded connector in order to reduce a thickness of the middle portion of the outer side wall of the molded connector, thereby enabling the outer side wall and the outer lip to be deformed only inward into the car so as to enhance airtight contact between the outer lip and the door glass.

3. The glass run according to claim 2, wherein said outer groove extends obliquely from said corner portion and walls of said molded connector which define said outer groove therebetween also extending obliquely from said corner portion, said outer groove having substantially the same width between said walls throughout the length of said outer groove.

4. A glass run adapted to be fit into a door sash of a car for guiding a descending or ascending door glass, said glass run comprising two substantially straight glass run portions and a molded connector for connecting the two substantially straight glass run portions at a corner portion formed by said molded connector, wherein said two substantially straight glass run portions and said molded connector each comprise an outer side wall, a bottom wall, and an inner side wall which together form a U-shaped groove for guiding the door glass;

wherein said two substantially straight glass run portions and said molded connector each further comprise an outer lip extending from the outer side wall into the U-shaped groove, and an inner lip extending from the inner side wall into the U-shaped groove, said outer and inner lips being adapted to hold the door glass through frictional contact; and wherein an outer groove is formed in a middle portion of an outer surface of the outer side wall of the molded connector in order to reduce a thickness of the middle portion of the outer side wall of the molded connector, said outer groove extending obliquely from said corner portion and walls of said molded connector which define said outer groove therebetween also extending obliquely from said corner portion, said outer groove having substantially the same width between said walls throughout the length of said outer groove, thereby enabling the outer side wall and the outer lip to be deformed only inward into the car so as to enhance airtight contact between the outer lip and the door glass.

5. A molded connector for connecting together two substantially straight glass run portions of a glass run which is adapted to be fit into a door sash of a car for guiding a descending or ascending door glass, said molded connector defining a corner portion of said class run, and said molded connector comprising;

an outer side wall, a bottom wall, and an inner side wall which together form a U-shaped groove for guiding the door glass; and an outer lip extending from the outer side wall into the U-shaped groove, and an inner lip extending from the inner side wall into the U-shaped groove, said outer and inner lips being adapted to hold the door glass through frictional contact;

wherein an inner groove is formed in a middle portion of an outer surface of the inner side wall of the molded connector in order to reduce a thickness of the middle portion of the inner side wall of the molded connector, said inner groove extending obliquely from said corner portion and walls of said molded connector which define said inner groove therebetween also extending obliquely from said corner portion, said inner groove having substantially the same width between said walls throughout the length of said inner groove, thereby enabling the inner side wall and the inner lip to be deformed only outward from the car so as to enhance airtight contact between the inner lip and the door glass.

6. The molded connector according to claim 5, wherein an outer groove is formed in a middle portion of an outer surface of the outer side wall of the molded connector in order to reduce a thickness of the middle portion of the outer side wall of the molded connector, thereby enabling the outer side wall and the outer lip to be deformed only inward into the car so as to enhance airtight contact between the outer lip and the door glass.

7. The molded connector according to claim 6, wherein said outer groove extends obliquely from said corner portion and walls of said molded connector which define said outer groove therebetween also extending obliquely from said corner portion, said outer groove having substantially the same width between said walls throughout the length of said outer groove.

8. A molded connector for connecting together two substantially straight glass run portions of a glass run which is adapted to be fit into a door sash of a car for guiding a descending or ascending door glass, said molded connector defining a corner portion of said glass run, and said molded connector comprising:

an outer side wall, a bottom wall, and an inner side wall which together form a U-shaped groove for guiding the door glass; and an outer lip extending from the outer side wall into the U-shaped groove, and an inner lip extending from the inner side wall into the U-shaped groove, said outer and inner lips being adapted to hold the door glass through frictional contact;

wherein an outer groove is formed in a middle portion of an outer surface of the outer side wall of the molded connector in order to reduce a thickness of the middle portion of the outer side wall of the molded connector, said outer groove extending obliquely from said corner portion and walls of said molded connector which define said outer groove therebetween also extending obliquely from said corner portion, said outer groove having substantially the same width between said walls throughout the length of said outer groove, thereby enabling the outer side wall and the outer lip to be deformed only inward into the car so as to enhance airtight contact between the outer lip and the door glass.

* * * * *